United States Patent [19]
Goto et al.

[11] Patent Number: 5,714,806
[45] Date of Patent: Feb. 3, 1998

[54] AIR-CONDITIONING SYSTEM FOR VEHICLE

[75] Inventors: Naomi Goto, Otsu; Makoto Yoshida, Kusatsu, both of Japan

[73] Assignee: Matsushita Electric Industrial Co., Ltd., Osaka, Japan

[21] Appl. No.: 733,016

[22] Filed: Oct. 16, 1996

[30] Foreign Application Priority Data

Oct. 17, 1995 [JP] Japan .................. 7-268216

[51] Int. Cl.$^6$ .................................................. B60H 1/00
[52] U.S. Cl. ........................ 307/10.1; 62/230; 62/244
[58] Field of Search ............................... 307/9.1, 10.1; 62/239, 244, 230, 243, 126, 323.3, 231

[56] References Cited

U.S. PATENT DOCUMENTS

| 5,408,842 | 4/1995 | Goto et al. ............... 62/230 |
| 5,595,064 | 1/1997 | Ikeda et al. .............. 62/230 |

*Primary Examiner*—Richard T. Elms
*Attorney, Agent, or Firm*—Wenderoth, Lind & Ponack

[57] ABSTRACT

A drive circuit 12 for driving an electric compressor 10 is connected with a DC power source 14. Arranged between the DC power source 14 and the drive circuit 12 is a switch 16 which, when turned on, supplies an electric current therethrough the drive circuit 12. Also a capacitor 22 is connected parallel to a drive circuit 12 and a switch 16 is connected parallel to a resistance 26. When starting, the control circuit 30 activates the drive circuit 12 to drive the compressor 10. Subsequently, the control circuit 30 turns the switch 16 on so that the current is supplied from the DC power source 14 to the drive circuit 12.

7 Claims, 6 Drawing Sheets

AIR-CONDITIONING SYSTEM FOR VEHICLE

FIELD OF THE INVENTION

The invention relates to an air-conditioning system for an automotive vehicle. Further, although not limited thereto, the invention is particularly usable in an electric car.

BACKGROUND OF THE INVENTION

An air-conditioning system for automotive vehicles, especially an electric car, employs an electric compressor. In this air-conditioning system, the electric compressor is electrically connected through a drive circuit with a DC power source so that activation of the drive circuit enables the DC power source to supply an electric current to the electric compressor. The electric current flowing from the DC power source through the drive circuit to the electric compressor is generally high. This results in large electric noises which disturb a radio set on the vehicle then receiving broadcast waves. Also, change in load on other devices also connected to the DC power source can lead to a surge voltage which can in turn damage related devices.

To overcome these shortcomings, the conventional air-conditioning system includes a smoothing capacitor for smoothing the electric current to thereby reduce both the electric noises and the voltage variation.

With reference to FIG. 5, the conventional air-conditioning system for vehicle will be described. This system has an electric compressor 10 powered by a three-phase alternating current. A drive circuit 12 for activating the compressor 10 is connected with a DC power source 14. The circuit 12 includes an invertor circuit (not shown) for transforming a DC current into an AC current. A circuit between the drive circuit 12 and the power source 14 includes a switch 16, a small resistance 18, and a fuse 20 for protecting the entire circuit. Therefore, turning on the switch 16 permits the DC power source 14 to feed its DC current to the drive circuit 12. Between the drive circuit 12 and the switch 16, a capacitor 22 having a large electrostatic capacity and a circuit 24 for detecting a voltage charged in the capacitor 22 are arranged parallel to the drive circuit 12. Also arranged parallel to the switch 16 is a resistance 26 for permitting the capacitor 22 to be charged even when the switch 16 is opened, i.e., turned off. A diode 28 is connected in series with the resistance 26 but parallel to the switch 16, so as to prevent the capacitor 22 from being charged when the DC power source is wrongly connected in the system with its positive and negative poles inverted.

The drive circuit 12 is designed to be activated by a control circuit 30 which is connected with a first controlling DC power source 32. The voltage detecting circuit 24 is also connected with the control circuit 24 to provide the latter with a signal indicative of the voltage detected thereby. An activating member, e.g., electromagnetic member 34, for activating the switch 16, is connected with a second controlling DC power source 38. The switch 16 and the electromagnetic member 34 altogether form a relay 36 of a type wherein when the electro-magnetic member 34 is energized or deenergized according to a signal from the control circuit 30 the switch 16 can be turned on or off.

In operation of the air-conditioning system so constructed, at the start of the electric compressor 10, the control circuit 30 energizes the electro-magnetic member 34 to turn the switch 16 of the relay 36 on. After a predetermined short time period, the control circuit 30 then activates the drive circuit 12 to start the electric compressor 10. The capacitor 22 smoothes the electric current flowing from the DC power source 14 to the drive circuit 12 as shown in FIG. 6B, so that the electric noises and adverse effects brought about by voltage variation can be reduced. For references, FIG. 6A illustrates a waveform of a current supplied from the power source 14 to the drive circuit 12 in a system in which the capacitor 22 is eliminated therefrom.

In this known air-conditioning device, however, the capacitor 22 is electrically charged to some extent due to the use of the resistance 26 even when the switch 16 is turned off. Therefore, it may often occur that an output voltage of the power source 14 lowers below a value equal to the charged voltage of the capacitor 22 at the start of the compressor 10 because of change in load on other devices commonly connected with the DC power source 14. In such case, a turning-on of the switch 16 permits the electric current to flow in a reverse direction from the capacitor 22 through the switch 16, resistance 18, and fuse 20 to the DC power source 14.

The same will occur if the first or second controlling DC power source 32 or 38 is interrupted instantaneously by any reason. At this time, in response to the interruption, the switch 16 is also turned off momentarily during which the electric current flows from the capacitor 22 to the drive circuit 12 with the charged voltage in the capacitor 22 reduced consequently. Therefore, a chattering of the switch 16 that can occur immediately after the interruption will permit the current to flow from the power source 14 to the capacitor 22.

In these cases, the maximum current flowing in the system is determined by dividing a voltage difference between the power source 14 and the capacitor 22 by the sum of all resistances including the resistance 18. Assuming that the resistance value is 0.2 Ω and the voltage difference is 100 V, a current flowing in the circuit is 500 A which is extremely high. This results in blowing of the fuse 20 and permanent adherence of contacts of the switch 16.

SUMMARY OF THE INVENTION

Accordingly, the primary object of the instant invention is to provide an air-conditioning system that prevent the blowing of the fuse and/or the permanent adherence of the contacts in the switch even though change occurs in the output of the DC power sources for driving the compressor and for activating the control circuit and switch.

To this end, according to the invention, when starting, firstly the control circuit instantaneously activates the drive circuit to drive the compressor. Subsequently, the control circuit turns on the switch so that the current is supplied from the DC power source to the drive circuit. Then, the compressor is set into a regular driving by activating the drive circuit again.

With the invention, even if the output voltage of the DC power source has decreased below the charged voltage of the capacitor due to load variations, because the charged voltage has already been reduced to or near the output of the DC power source by the instantaneous driving of the compressor, no heavy current flows from the capacitor to the DC power source. Therefore, there is no possibility that the fuse arranged between the capacitor and the DC power source may be blown off and the switch may be damaged.

In another aspect of the invention, the control circuit and the activating member are connected to a common controlling DC power source. Further, a voltage that the control circuit changes into non-operative state is set higher than a voltage that the activating member turns off the switch.

With this arrangement, when the controlling DC power source is interrupted momentarily, the control circuit changes into the non-operative state and then the switch turns off. Therefore, no current flows between the driving DC power source and the capacitor so that the charged voltage of the capacitor is kept identical to the output of the first DC power source. As a result, even when the switch is turned on right after that, no heavy current flows from the first DC power source to the capacitor, which prevents the fuse between them from blowing off and the switch from being damaged.

BRIEF DESCRIPTION OF THE DRAWINGS

This and other objects and features of the present invention will become clear from the following description taken in conjunction with the preferred embodiments thereof with reference to the accompanying drawings throughout which like parts are designated by like reference numerals, and in which:

FIGS. 2A to 2D are timing diagrams of the first embodiment in which FIG. 2A shows voltage variations of the driving DC power source and the capacitor, FIG. 2B shows a drive timing of the electric compressor, FIG. 2C shows a variation of current in the system, and FIG. 2D shows a drive timing of the relay;

FIGS. 4A to 4D are timing diagrams of the second embodiment in which FIG. 4A shows a variation of the DC power source and the capacitor, FIG. 4B shows a variation of a voltage of the controlling DC power source, FIG. 4C shows a drive timing of the compressor, and FIG. 4D shows a drive timing of the relay;

PREFERRED EMBODIMENT OF THE INVENTION

(1) FIRST EMBODIMENT

Figure 1:
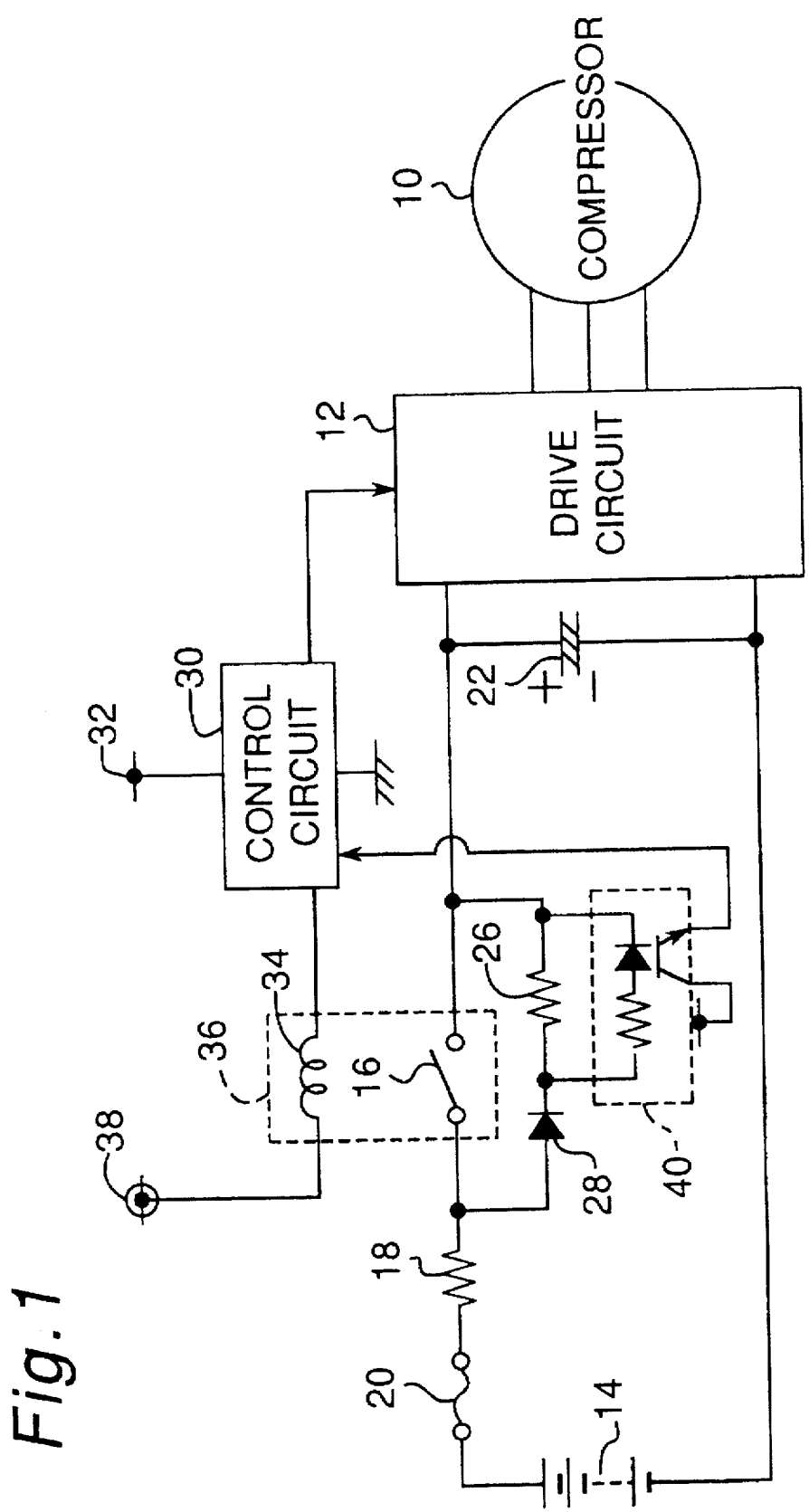
FIG. 1 is a circuit diagram of a first embodiment of an air-conditioning system according to the invention.

FIG. 1 depicts a first embodiment of an airconditioning system according to the invention. In this air-conditioning system, a detecting circuit 40 for detecting a current flowing from the DC power source 14 to the capacitor 22 is connected parallel to the resistance 26. The current detect circuit 40 is electrically connected with the control circuit 30 so that a value of the detected current can be transmitted to the control circuit 30.

Figure 2A:
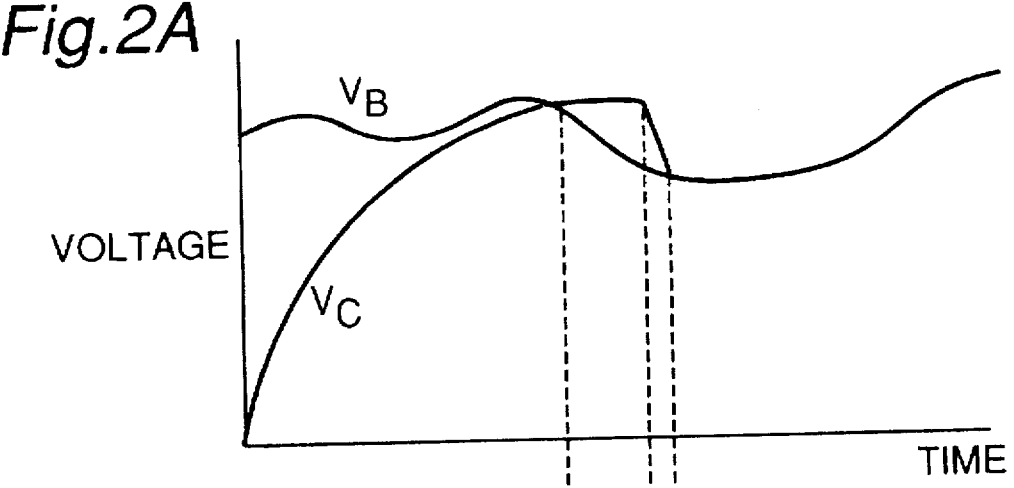
Figure 2B:
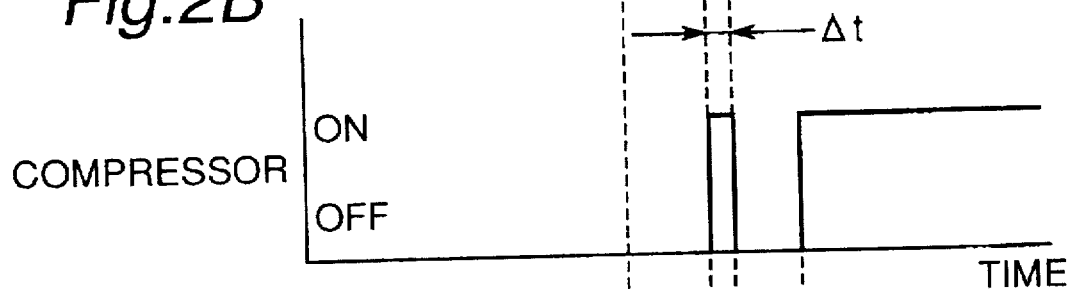
Figure 2C:
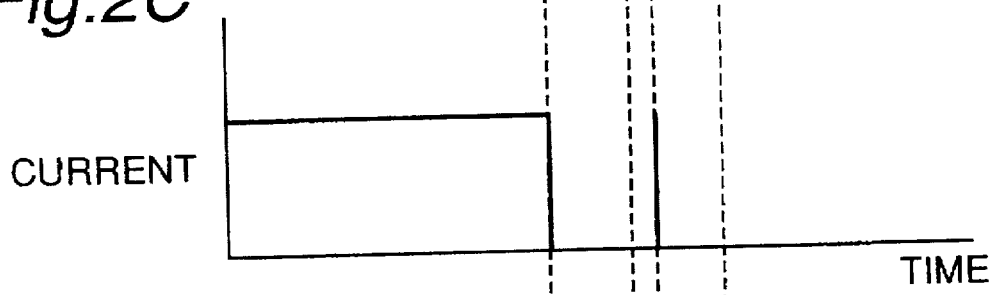

In operation, upon receiving an instruction to start the electric compressor 10, as shown in FIG. 2A, due to the use of the resistance 26, a current flows from the DC power source 14 through the diode 28 to the capacitor 22 to charge the capacitor 22. A voltage $V_C$ charged on the capacitor 22 is illustrated in FIG. 2A. Subsequently, if the capacitor 22 is fully charged and as a result the current detecting circuit 40 detects a drop in current down to zero as shown in FIG. 2C (at timing t1), the control circuit 30 determines that the capacitor 22 has already been fully charged.

Figure 2D:
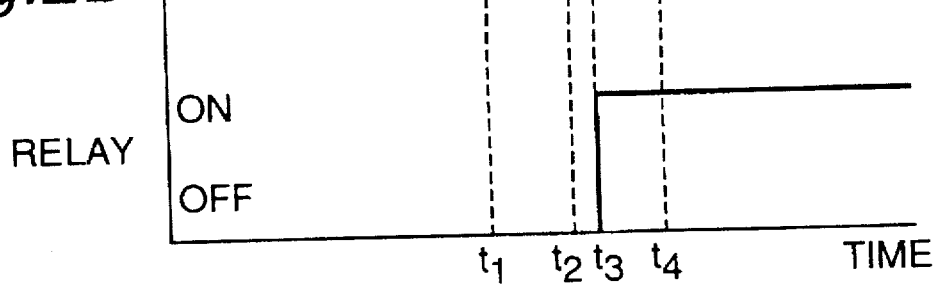

After a predetermined short time from the completion of the charging, at timing t2, while keeping the switch 16 off, the control circuit 30 outputs an activating signal to the drive circuit 12 to drive the electric compressor 10 for a short period of time Δt (see FIG. 2B), accompanied by decrease of the charged voltage $V_C$. When this time period Δt has passed; at timing t3, the control circuit 30 turns the relay switch 16 (see FIG. 2D) on. After another predetermined time has passed, at timing t4, the control circuit 30 activates the drive circuit 12 to set the electric compressor 10 into a regular driving state (see FIG. 2B).

Let it be assumed that, at the starting of the compressor 10, as shown in FIG. 2A, the output voltage $V_B$ of the DC power source 14 has dropped below the charged voltage $V_C$ of the capacitor 22 due to other load variations. In this case, as described above, because the compressor 10 is driven instantaneously while the relay switch 16 is kept off at a timing t2 a predetermined time after completion of the charging of the capacitor 22 and thereby the charged voltage $V_C$ decreases to or near the reduced output voltage $V_B$, the control circuit 30 turns off the relay switch 16, and finally the control circuit 30 activates the drive circuit 12 to drive the electric compressor 10, no current flows from the capacitor 22 to the DC power source 14, thereby eliminating the possibility of the fuse 20 being blown off and also that of the relay switch 16 being damaged.

Note that the short time period Δt is not limited to a specific value, but it may be so determined depending upon the current that flows in the system that the charged voltage of the capacitor 22 can be decreased to or near the reduced output voltage of the DC power source 14.

Also, the timing at which the instantaneous driving of the compressor 10 terminates may be determined in any other way. For example, because the current flows from the DC power source 14 to the capacitor 22 only when the output voltage of the DC power source 14 is higher than the charged voltage in the capacitor 22, detection of the current flow by the detector 40 may turn off compressor 10.

(2) SECOND EMBODIMENT

Figure 3:
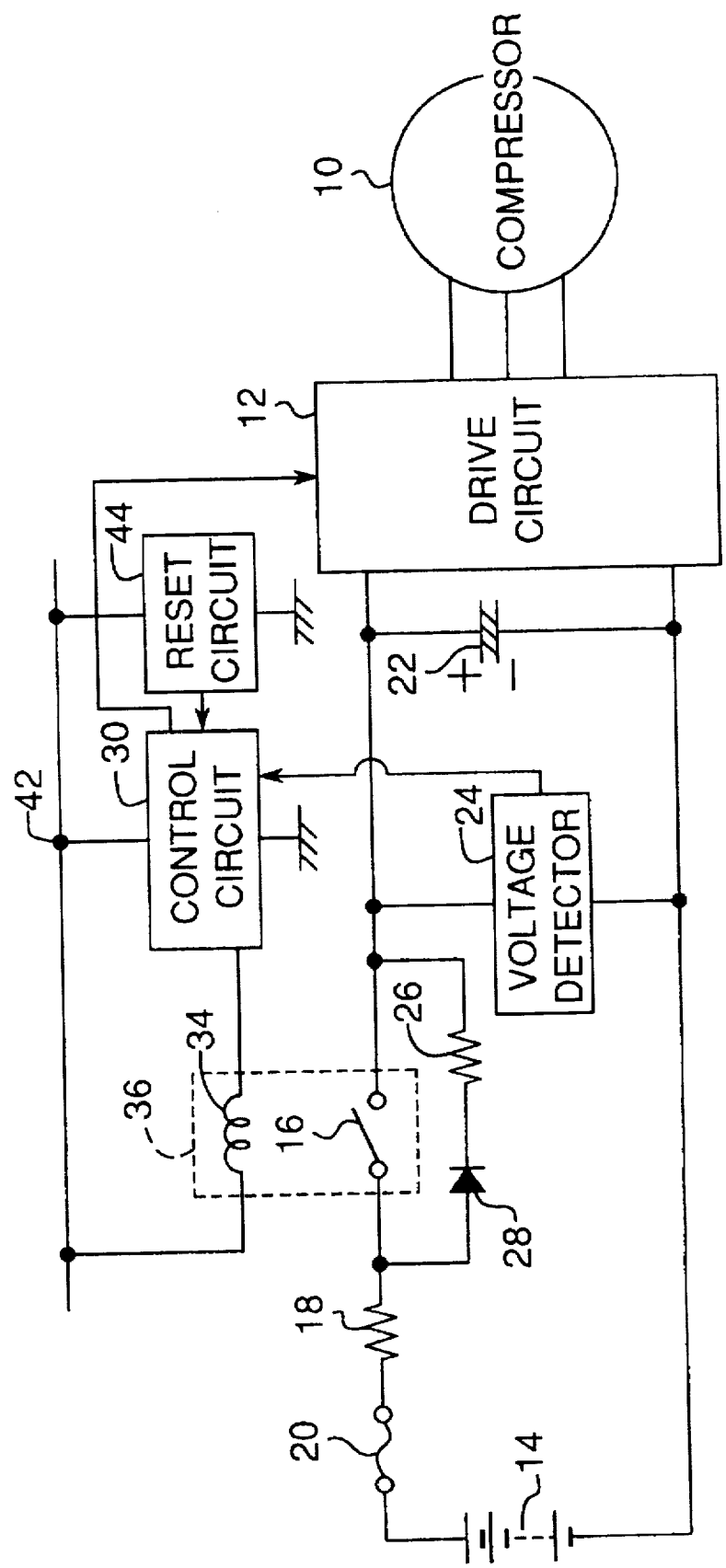
FIG. 3 is a circuit diagram of a second embodiment of the air-conditioning device according to the invention.

FIG. 3 depicts a second embodiment of an air-conditioning system according to the invention. In this air-conditioning system, the control circuit 30 and the electro-magnetic member 34 are connected with the same controlling DC power source 42 so that if the control circuit 30 is powered off the relay switch 16 can be turned off. Connected to the controlling DC power source 42 is a reset circuit 44 which detects the voltage supplied from the DC power source 42. Also, if the reset circuit 44 detects that the voltage has decreased to or below a predetermined reset voltage $V_R$, it generates a reset signal that changes the control circuit 30 into non-operative condition.

Figure 4A:
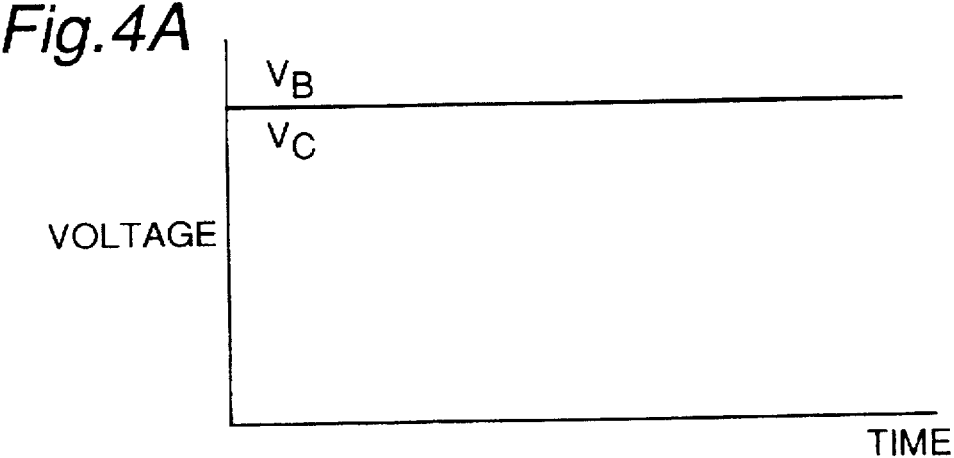
Figure 4B:
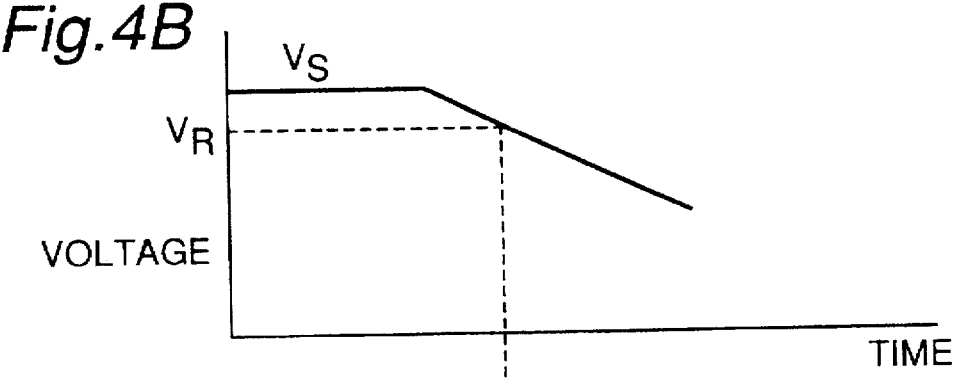

According to this embodiment, as shown in FIG. 4B, when the voltage $V_S$ of the DC power source 42 has decreased to or below the reset voltage $V_R$ (see FIG. 2B), the reset circuit 44 changes the control circuit 30 into non-operative condition. As a result, the electric compressor 10 is turned off. Also, the relay switch 16 is turned off.

At this time, the control circuit 30 changes into the non-operative condition right before the relay 20 is turned off. The is because the control circuit 30 consists of electronic parts so that it will be changed into the non-operative condition immediately after receiving a signal from the reset circuit 44 and, on the other hand, the switch 16 of the relay 36 consists of various mechanical parts, e.g., leaf springs and contacts, so that it takes more time before switch contacts are disengaged from each other subsequent to the electromagnetic member 34 having been deenergized.

Figure 4C:
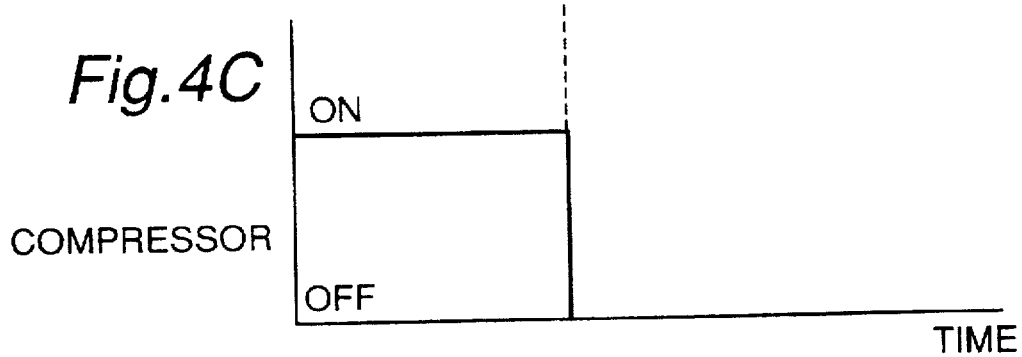

Also, because the drive circuit 12 turns off the compressor 10 as soon as the reset circuit 44 detects that the voltage $V_S$ has decreased to or below the reset voltage $V_R$ (see FIG. 4C), no current flows from the capacitor 22 to the drive circuit 12, which keeps the charged voltage $V_C$ identical to the output voltage $V_B$ of the DC power source 14.

After that, if the voltage $V_B$ of the control power source 42 has recovered to its normal state, due to the use of the resistance 26 the current flows from the DC power source 14 to charge the capacitor 22, if the capacitor 22 has not been fully charged. Subsequently, when the switch 16 is turned on, the drive circuit 12 is activated to drive the electric compressor 10.

Figure 4D:
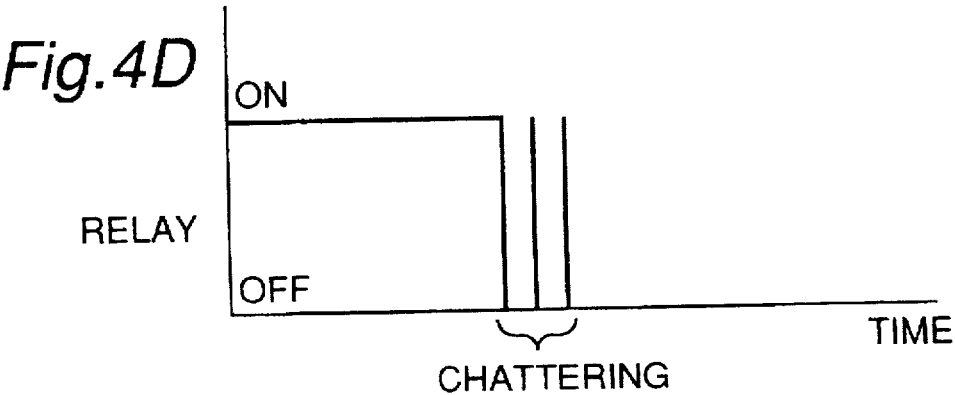
Figure 5:
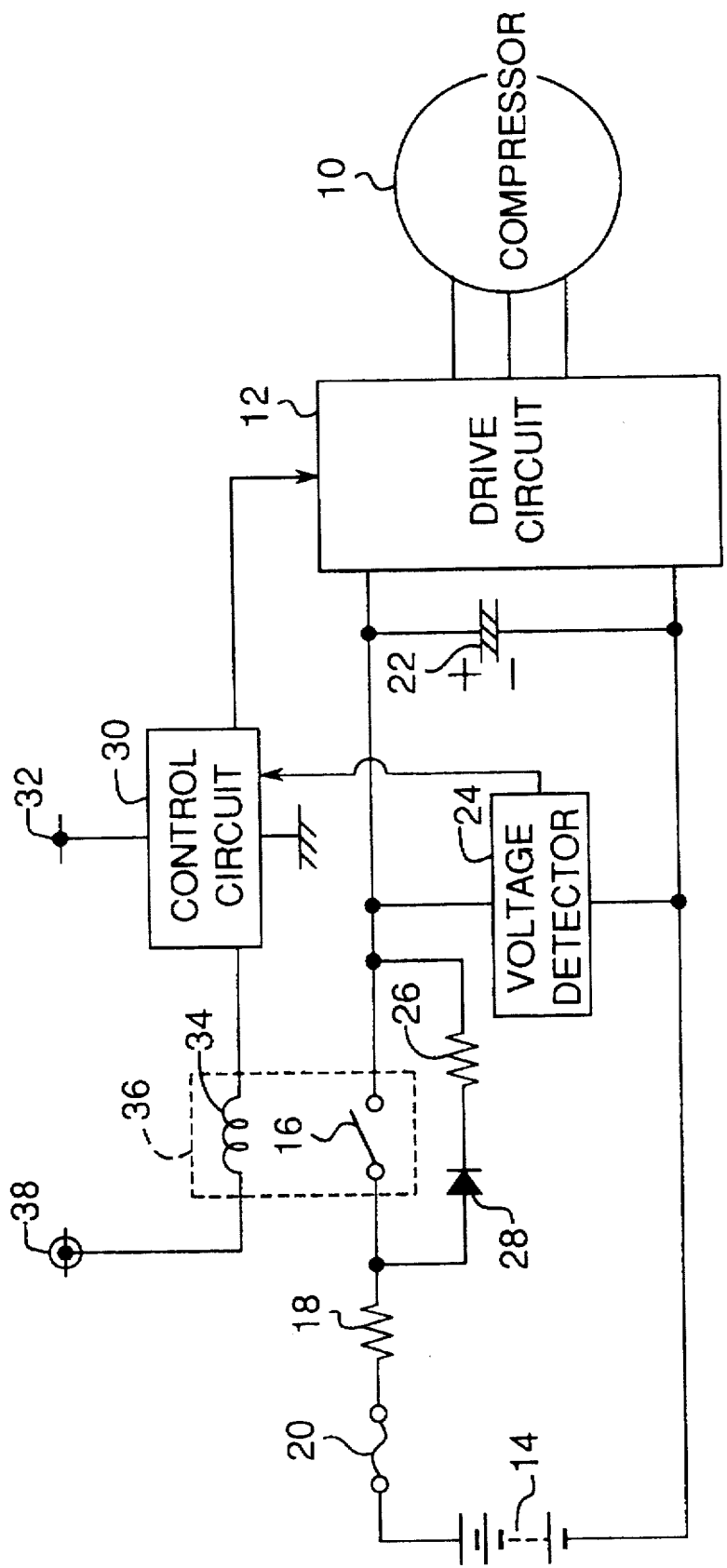
FIG. 5 is a circuit diagram of the conventional air-conditioning system.
Figure 6A:
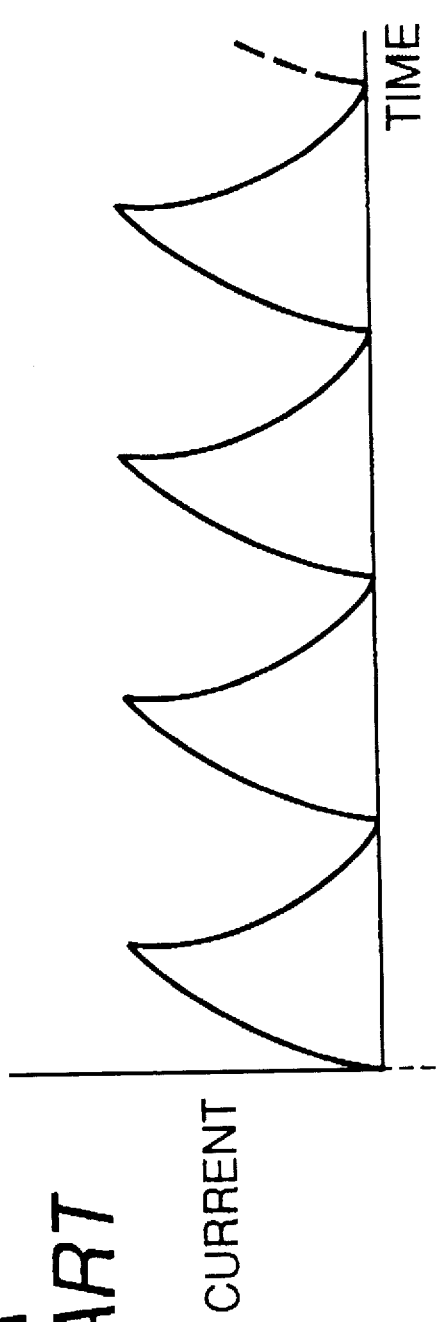
FIG. 6A shows a waveform of a current supplied to the compressor in the system where no smoothing capacitor is employed.
Figure 6B:
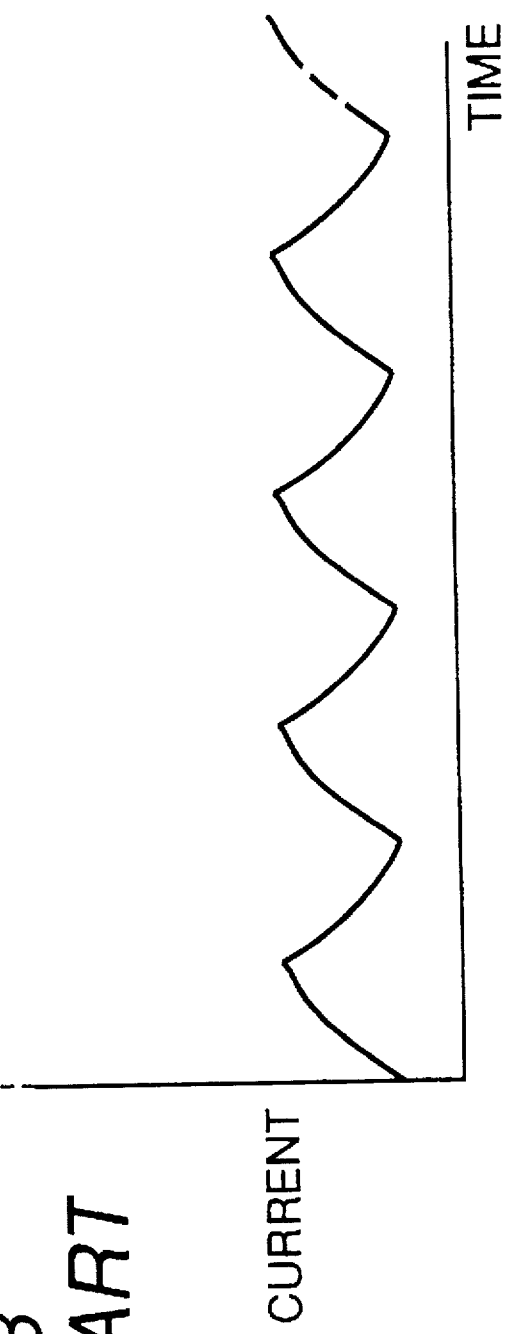
FIG. 6B shows a waveform of the current supplied to the compressor in the system shown in FIG. 5 including the smoothing capacitor.

As has been described, even when the voltage of the control power source 22 has dropped by any reason, no heavy current flows between the DC power source 14 and the capacitor 22 and, therefore, there is no possibility that the fuse may be blown off and the contacts of the switch may be damaged. Although, due to the use of the mechanical spring element the switch 16 may be repeatedly switched on and off in a short time, i.e., may undergo chattering, right after it has been turned off (see FIG. 4D), no heavy current flows between the DC power source and the capacitor 22 during this chattering.

(3) MODIFICATIONS

Although the present invention has been described in connection with the particular embodiments thereof, many other variations and modifications and other uses will become apparent to those skilled in the art.

For instance, the DC power source may not be limited to a battery, and a generator capable of supplying a high voltage can be used as the DC power source. Also, not limited to the relay, the switch may be employed in the form of not only an electro-mechanical device, but in the form of an electronic switch such as a transistor or any other semiconductor.

Further, in the first embodiment, though the compressor is always driven for a short time in its starting operation, the system may includes a first detector for detecting the output voltage of the DC power source, and a second detector for detecting the charged voltage of the capacitor, so that when the charged voltage is higher than the output voltage the control circuit can cause the compressor to drive for a short time period corresponding to the voltage differences thereof.

We claim:

1. An air-conditioning system for a vehicle, comprising:
    (a) a DC power source;
    (b) a drive circuit connected with the DC power source;
    (c) an electric compressor driven by the drive circuit;
    (d) a switch connected between the DC power source and the drive circuit;
    (e) a capacitor connected parallel to the drive circuit;
    (f) means connected parallel to the switch for permitting a current to flow from the DC power source to the capacitor when the switch is turned off; and
    (g) a control circuit for controlling the drive circuit and the switch;
    (h) wherein the control circuit activates the drive circuit to drive the compressor for a short predetermined time and then turns on the switch.

2. A system as claimed in claim 1, further comprising a diode connected in series with said means and parallel to the switch for preventing to prevent the current from flowing from the capacitor through said means to the DC power source.

3. An air-conditioning system for a vehicle, comprising:
    (a) a DC power source;
    (b) a drive circuit connected with the DC power source;
    (c) an electric compressor driven by the drive circuit;
    (d) a switch connected between the DC power source and the drive circuit;
    (e) a capacitor connected parallel to the drive circuit;
    (f) means connected parallel to the switch for permitting a current to flow from the DC power source to the capacitor when the switch is turned off; and
    (g) a current detector for detecting the current flowing through said means; and
    (h) a control circuit for controlling the drive circuit and the switch;
    (i) wherein the control circuit activates the drive circuit to drive the compressor before turning on the switch and then deactivates the drive circuit to halt the compressor when the current detector detects the current flow.

4. A system as claimed in claim 3, further comprising a diode connected in series with said means and parallel to the switch for preventing to prevent the current from flowing from the capacitor through said means to the DC power source.

5. An air-conditioning system for vehicle, comprising:
    (a) a DC power source;
    (b) a drive circuit connected with the DC power source;
    (c) an electric compressor driven by the drive circuit;
    (d) a switch connected between the DC power source and the drive circuit;
    (e) a capacitor connected parallel to the drive circuit;
    (f) means connected parallel to the switch for permitting a current to flow from the DC power source to the capacitor when the switch is turned off;
    (g) a control circuit for controlling the drive circuit and the switch;
    (h) a first voltage detector for detecting an output voltage of the DC power source; and
    (i) a second voltage detector for detecting a charged voltage of the capacitor;
    (j) wherein the control circuit activates the drive circuit to drive the compressor for a short predetermined time and then turns on the switch, provided that the charged voltage is more than the output voltage by a predetermined voltage.

6. An air-conditioning system for vehicle, comprising:
    (a) a first DC power source;
    (b) a drive circuit connected with the first DC power source;
    (c) an electric compressor driven by the drive circuit;
    (d) a switch connected between the first DC power source and the drive circuit;
    (e) a capacitor connected parallel to the drive circuit;
    (f) means connected parallel to the switch for permitting a current to flow from the first DC power source to the capacitor when the switch is turned off;
    (g) a second DC power source;
    (h) an activating member connected with the second DC power source for activating the switch; and
    (i) a control circuit connected with the second DC power source for activating the drive circuit;
    (j) wherein a voltage at which the control circuit changes into a non-operative state is higher than a voltage at which the switch will turn off.

7. A system claimed in claim 6, wherein the switch and the activating member altogether constitute a relay.

* * * * *